US012612099B2

(12) United States Patent
Hong

(10) Patent No.: US 12,612,099 B2
(45) Date of Patent: Apr. 28, 2026

(54) STEERING CONTROL DEVICE, STEERING CONTROL METHOD, AND STEERING SUPPORT SYSTEM INCLUDING SAME

(71) Applicant: HL MANDO CORPORATION, Gyeonggi-do (KR)

(72) Inventor: Seung Gyu Hong, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 788 days.

(21) Appl. No.: 17/616,977

(22) PCT Filed: Jun. 3, 2020

(86) PCT No.: PCT/KR2020/007188
§ 371 (c)(1),
(2) Date: Dec. 6, 2021

(87) PCT Pub. No.: WO2020/246787
PCT Pub. Date: Dec. 10, 2020

(65) Prior Publication Data
US 2022/0242479 A1       Aug. 4, 2022

(30) Foreign Application Priority Data
Jun. 7, 2019     (KR) ........................ 10-2019-0067515

(51) Int. Cl.
B62D 5/04          (2006.01)
B62D 3/12          (2006.01)
B62D 6/10          (2006.01)
(52) U.S. Cl.
CPC ............. B62D 5/0463 (2013.01); B62D 3/12 (2013.01); B62D 6/10 (2013.01)
(58) Field of Classification Search
CPC ................ B62D 6/008; B62D 6/08–10; B62D 5/0457–0496

(Continued)

(56) References Cited

U.S. PATENT DOCUMENTS

2004/0256171 A1* 12/2004 Sugitani ................. B62D 6/002
                                                                    180/402
2006/0234537 A1* 10/2006 Sugitani ................. B62D 5/003
                                                                    439/164
(Continued)

FOREIGN PATENT DOCUMENTS

CN          107000782          8/2017
CN          108082275 A        5/2018
(Continued)

OTHER PUBLICATIONS

Greul R—English description of DE-102011055935-A1 via Espacenet Patent Translate, retrieved Feb. 18, 2025. (Year: 2025).*
(Continued)

*Primary Examiner* — Erin M Piateski
*Assistant Examiner* — Paul Allen
(74) *Attorney, Agent, or Firm* — WOMBLE BOND DICKINSON (US) LLP

(57) ABSTRACT

Disclosed are a steering control device, a steering control method, and a steering support system including same. Particularly, a steering control device according to the disclosure comprises: a command value calculator for calculating, on the basis of steering information corresponding to the rotation of a steering wheel, a rack movement command value that commands the movement of a rack; a difference value calculator for calculating the difference value between the rack movement command value and the rack movement sensing value by receiving a rack movement sensing value corresponding to the movement of the rack when the movement of the rack is sensed; and a reaction torque calculator for calculating reaction torque on the basis of the difference value and one or more preset virtual linkage parameters.

15 Claims, 14 Drawing Sheets

(58) Field of Classification Search
USPC ...................................................... 701/41–44
See application file for complete search history.

(56) References Cited

U.S. PATENT DOCUMENTS

| | | | |
|---|---|---|---|
| 2011/0282551 A1* | 11/2011 | Sasaki | B62D 5/065 |
| | | | 701/42 |
| 2015/0353124 A1* | 12/2015 | Chai | B62D 6/008 |
| | | | 701/41 |
| 2016/0347357 A1* | 12/2016 | Kitazume | B62D 6/00 |
| 2017/0066476 A1* | 3/2017 | Kudo | B62D 5/0463 |
| 2018/0346021 A1 | 12/2018 | Wang et al. | |
| 2020/0094870 A1* | 3/2020 | Shoji | B62D 5/0463 |
| 2020/0262473 A1* | 8/2020 | Kreis | B62D 6/002 |
| 2020/0283063 A1* | 9/2020 | Kashi | B62D 6/003 |

FOREIGN PATENT DOCUMENTS

| | | | | |
|---|---|---|---|---|
| CN | 109383617 A | 2/2019 | | |
| DE | 10 2012 008 230 | 11/2012 | | |
| DE | 102011055935 A1 * | 6/2013 | ........... | B62D 5/0466 |
| DE | 102017122169 A1 | 3/2018 | | |
| DE | 10 2018 123 615 | 3/2019 | | |
| JP | 10-217998 | 8/1998 | | |
| JP | 2008-222115 | 9/2008 | | |
| JP | 2010-217998 A | 9/2010 | | |
| JP | 6079942 | 2/2017 | | |
| JP | 6079942 B2 | 2/2017 | | |
| JP | 2018-43730 | 3/2018 | | |
| KR | 10-2017-0082355 | 7/2017 | | |
| KR | 10-2017-0090444 | 8/2017 | | |
| KR | 10-2017-0090444 A | 8/2017 | | |
| KR | 10-2018-0007393 | 1/2018 | | |
| KR | 10-2019-0037507 | 4/2019 | | |
| WO | 2016/017234 | 2/2016 | | |
| WO | WO-2019120699 A1 * | 6/2019 | ............ | B62D 5/001 |

OTHER PUBLICATIONS

Kreis C—English description of WO-2019120699-A1 via Espacenet Patent Translate, retrieved Feb. 19, 2025. (Year: 2025).*

Notice of Allowance dated Apr. 15, 2024 for Chinese Patent Application No. 202080042029.X and its English translation provided by Global Dossier.

Notice of Allowance dated Apr. 27, 2024 for Korean Patent Application No. 10-2019-0067515 and its English translation provided by Global Dossier.

Qingnian Wang et al., "Validation of Differential Drive Assisted Steering System by Offline Simulation", Automotive Engineering, vol. 31, No. 6, 2009, pp. 545 to 551, English Abstract Provided.

Yan Li, et al., "Simulation and Modeling of Rack and Pinion of Automobile Steering Device", Modern Manufacturing Technology and Equipment, Issue 12, 2010, 5 pp. total, English Abstract Provided.

Office Action dated Feb. 22, 2024 for Korean Patent Application No. 10-2019-0067515 and its English machine translation from Global Dossier.

International Search Report for PCT/KR2020/007188 mailed on Sep. 3, 2020 (now published as WO 2020/246787) with English translation provided by WIPO.

Written Opinion of the International Searching Authority for PCT/KR2020/007188 mailed on Sep. 3, 2020 (now published as WO 2020/246787) with English translation provided by Google Translate.

Office Action dated Dec. 1, 2023 for Chinese Patent Application No. 202080042029.X and its English machine translation by Google Translate.

International Preliminary Report on Patentability (Chapter I) for PCT/KR2020/007188 issued on Dec. 7, 2021 and its English translation from WIPO (now published as WO 2020/246787).

* cited by examiner

100

STEERING CONTROL DEVICE, STEERING CONTROL METHOD, AND STEERING SUPPORT SYSTEM INCLUDING SAME

CROSS-REFERENCE TO RELATED APPLICATIONS

The present application is the national stage of International Patent Application No. PCT/KR2020/007188 filed on Jun. 3, 2020, which claims the priority to Korean Patent Application No. 10-2019-0067515 filed in the Korean Intellectual Office on Jun. 7, 2019, the entire contents of which are incorporated herein by reference.

TECHNICAL FIELD

The present disclosure relates to steering control devices and methods, and steering assistance systems that include the steering control device and are capable of performing the steering control method.

BACKGROUND ART

As steering assistance systems of vehicles, there have been developed and applied a hydraulic type of steering assistance system configured to steer a vehicle by generating hydraulic fluid pressure using a power steering pump and an electronic type of steering assistance system configured to steer a vehicle using an electric motor.

In the vehicle steering assistance systems, when a driver turns a steering wheel, it may be desired to provide the driver with an appropriate steering feel according to driving situations so that the driver can recognize the steering feel for steering operation of the vehicle according to the turning of the steering wheel. In addition, such a steering feel may be provided by a connect-force-generating motor connected through the steering wheel, a steering column, and the like.

In this regard, recently, a steer-by-wire type of steering system configured to electrically drive vehicle wheels without a mechanical connection between the steering wheel of the vehicle and the vehicle wheels has been applied to vehicles. The steer-by-wire system performs steering of the vehicle by operating a steering motor operably connected to at least one wheel of the vehicle by the control of an electronic controller unit (ECU) configured to sense a rotation signal of the steering wheel.

Since the steer-by-wire system does not have the mechanical connection, therefore, a need has arisen for a device, method and/or system for providing an appropriate steering feel as in a steering assistance system having such a mechanical connection.

DETAILED DESCRIPTION OF THE INVENTION

Technical Problem

To address these issues, embodiments of the present disclosure provide a steering control device, a steering control method, and a steering assistance system that provide an appropriate steering feel to a driver by determining an appropriate counter torque through the application of at least one characteristic of a virtual linkage.

Further, embodiments of the present disclosure provide a steering control device, a steering control method, and a steering assistance system that provide an optimal steering feel to a driver by implementing a counter torque through the application of information related to a traveling situation, as well as information related to a connection between a steering wheel and a rack.

Technical Solution

According to one aspect of the present disclosure, a steering control device included in a steering assistance system is provided which includes a command value calculator for calculating a rack movement command value indicating a movement of a rack based on steering information related to the turning of a steering wheel; a difference value calculator for receiving a rack movement detection value obtained by detecting the movement of the rack when the movement of the rack is detected and calculating a difference value between the rack movement command value and the rack movement detection value; and a counter torque calculator for calculating a counter torque based on the difference value and one or more virtual linkage parameters set in advance, the one or more virtual linkage parameters correspond to one or more characteristics of a virtual linkage between the steering wheel and the rack, which are mechanically separated.

According to another aspect of the present disclosure, a steering control method is provided which includes calculating a rack movement command value indicating a movement of a rack based on steering information related to the turning of a steering wheel; by receiving a rack movement detection value obtained by detecting the movement of the rack when the movement of the rack is detected, calculating a difference value between the rack movement command value and the rack movement detection value; and calculating a counter torque based on the difference value and one or more virtual linkage parameters set in advance, the one or more virtual linkage parameters correspond to one or more characteristics of a virtual linkage between the steering wheel and the rack, which are mechanically separated.

According to further another aspect of the present disclosure, a steering assistance system having a structure in which a mechanical connection between a steering input device and a steering output device is not formed. The steering assistance system including: a steering angle sensor for detecting a steering angle according to the turning of a steering wheel, a counter-force-generating motor for supplying a counter force to the steering wheel, a steering motor for axially moving a rack, a rack position sensor for detecting a position of the rack, and a steering control device for controlling the steering motor based on steering information and controlling the counter-force-generating motor based on the steering information and rack position information received from the rack position sensor. The steering control device calculates a rack movement command value indicating a movement of the rack based on the steering information, receives a rack movement detection value from a rack position sensor and calculates a difference value between the rack movement command value and the rack movement detection value, calculates a counter torque based on the difference value and one or more virtual linkage parameters set in advance, and supplies a driving current corresponding to the calculated counter torque to the counter-force-generating motor, the one or more virtual linkage parameters corresponding to one or more characteristics of a virtual linkage between the steering input device and the steering output device.

Effects of the Invention

According to embodiments of the present disclosure, it is possible to provide a steering control device, a steering control method, and a steering assistance system that provide an appropriate steering feel to a driver by determining an appropriate counter torque through the application of at least one characteristic of a virtual linkage.

Further, according to embodiments of the present disclosure, it is possible to provide a steering control device, a steering control method, and a steering assistance system that provide an optimal steering feel to a driver by implementing a counter torque through the application of information related to a traveling situation, as well as information related to a connection between a steering wheel and a rack.

BEST MODE FOR CARRYING OUT THE INVENTION

Hereinafter, embodiments of the present disclosure will be described in detail with reference to the accompanying drawings. Terms, such as "first", "second", "A", "B", "(A)", or "(B)" may be used herein to describe elements of the disclosure. Each of these terms is not used to define essence, order or sequence of elements etc., but is used merely to distinguish the corresponding element from other elements. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

Figure 1:
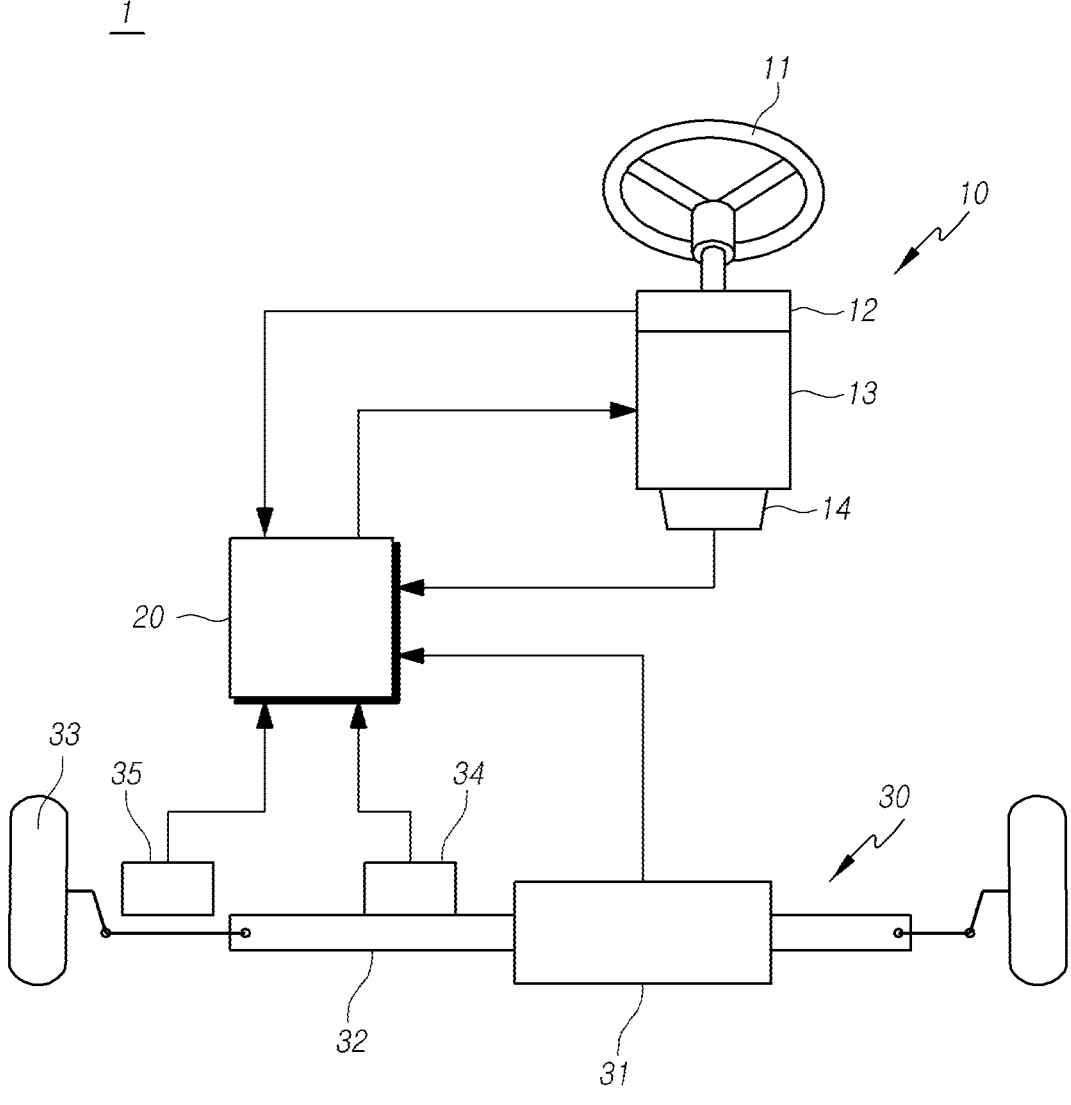
FIG. 1 schematically illustrates a steering assistance system according to aspects of the present disclosure.

FIG. 1 schematically illustrates a steering assistance system according to aspects of the present disclosure.

Referring to FIG. 1, the steering assistance system 1 according to aspects of the present disclosure may refer to a system capable of assisting a steering force so that a driver can easily steer.

The steering assistance systems may be classified into a hydraulic power steering (HPS) configured to provide a steering assistance force by generating hydraulic fluid pressure using a pump, an electronic power steering (EPS) configured to provide a steering assistance force by driving a motor, and the like. Hereinafter, for convenience of description, discussions for embodiments of the present disclosure will be conducted with respect to the electronic power steering system; however, embodiments of the present disclosure are not limited thereto. That is, it should be understood that such discussions may be applied to other steering systems including the hydraulic power steering system mutatis mutandis.

Meanwhile, according to whether a mechanical connection member (or linkage) between a steering input device 10 and a steering output device 30 is provided or formed, the steering system may be a mechanical steering assistance system configured to steer vehicle wheels 33 as a force (torque) generated by the turning of a steering wheel 11 by a driver is transmitted to an actuator located in at least one wheel 33 through a mechanical power transmission device (e.g., a linkage, etc.), or a steer-by-wire (SbW) system configured to transmit power, instead of the mechanical power transmission device, by transmitting/receiving electrical signals through a wire, a cable, and/or the like. Hereinafter, the steering assistance system 1 according to aspects of the present disclosure will be described with respect to the steer-by-wire system; however, embodiments of the present disclosure are not limited thereto. That is, it should be understood that such description may be applied to other steering assistance systems including the mechanical steering assistance system mutatis mutandis.

The steering assistance system 1 according to aspects of the present disclosure may include a steering input device 10, a steering controller 20, a steering output device 30, and the like. As described above, when the steer-by-wire type of steering assistance system 1 is employed, the steering input device 10 and the steering output device 30 are mechanically separated from each other.

The steering input device 10 may refer to a device to which steering information intended by a driver is input. The steering input device 10 may include the steering wheel 11, a steering angle sensor 12, a counter-force-generating motor 13, a driver-supplying-torque sensor 14, and the like.

The steering angle sensor 12 can detect a steering angle according to the turning of the steering wheel 11. Specifically, when the steering wheel 11 is turned by a driver, the steering angle sensor 12 can detect a rotation angle (a steering angle) of the steering wheel 11, and provide a detection signal (or a detection value) indicating the detected steering angle to the steering control device 20.

The counter-force-generating motor 13 can apply a counter torque to the steering wheel 11 by receiving a control signal, a command signal, a driving current, and the like from the steering control device 20. Specifically, the counter-force-generating motor 13 can receive the driving current from the steering control device 20, and provide the counter torque by driving at a rotation speed according to the driving current.

The driver-supplying-torque sensor 14 can detect a driver torque through the turning of the steering wheel 11 by a driver. Specifically, when the steering wheel 11 is turned by the driver, the driver-supplying-torque sensor can detect the driver torque supplied by the driver to the steering wheel 11, and provide a detection signal (or a detection value) indicating the detected driver torque to the steering control device 20. Here, the driver torque may refer to a torque generated as the driver turns the steering wheel 11.

The steering control device 20 can calculate a control value by receiving steering information from the steering input device 10, and provide an electrical signal indicating the calculated control value to the steering output device 30. The steering information may refer to information containing at least one of the steering angle and the driver torque.

Further, the steering control device 20 may calculate a control value by performing feedback on power information actually output from the steering output device 30. Thereafter, the steering control device 20 can provide an electrical signal indicating the control value to the steering input device 10 to provide a steering feel to the driver.

The steering control device 20 may be implemented with an electronic control device such as an electronic controller unit (ECU), a microcomputer, or the like. The steering control device 20 will be described below in further detail.

The steering output device 30 may refer to a device capable of enabling the steering of a corresponding vehicle to be implemented in line with an intention of a driver. The steering output device 30 may include a steering motor 31, a rack 32, a rack position sensor 34, at least one vehicle wheel 33, a vehicle speed sensor 35, and the like.

The steering motor 31 can axially move the rack 32. Specifically, the steering motor 31 can be driven by receiving a driving current from the steering control device 20, and cause the rack 32 to linearly move in the axial direction.

The rack 32 can perform a linear motion by the driving of the steering motor 31, and vehicle wheels 33 can be steered left or right through the linear motion of the rack 32.

The rack position sensor 34 can detect a position of the rack 32. Specifically, as the rack 32 performs the linear motion, when the rack 32 moves from a position corresponding to a situation where the steering wheel 11 is in the neutral position, the rack position sensor 34 can detect an actual position of the rack 32, and provide a detection signal indicating the position detection value of the rack 32 to the steering control device 20.

Here, the rack position sensor 34 can detect an actual movement speed of the rack 32. That is, the rack position sensor 34 can detect a position of the rack 32, and calculate a movement speed of the rack 32 by differentiating the detected position of the rack 32 with respect to time, and provide a detection signal indicating the calculated movement speed value of the rack 32 to the steering control device 20. Accordingly, the rack position sensor 34 may further include a differentiator.

The vehicle speed sensor 35 can detect a traveling speed of a vehicle. Specifically, the vehicle speed sensor 35 can detect the traveling speed of the vehicle, and provide a detection signal indicating the traveling speed to the steering control device 20.

Although not shown, the steering assistance system 1 according to aspects of the present disclosure may further include a steering column, a pinion gear, a steering angle sensor for detecting a steering angle of at least one wheel 33, a yaw rate sensor for detecting a heading angle of a vehicle, a clutch capable of separating or combining the steering input device and the steering output device, and the like.

In a case where the steering assistance system 1 according to aspects of the present disclosure is implemented as the steer-by-wire system, since the steering input device 10 and the steering output device 30 are electrically connected instead of a mechanical linkage, it is desired to provide a steering feel to a driver taking account of at least one characteristic of a virtual linkage replacing characteristics of such a mechanical linkage.

Hereinafter, the steering control device 20 capable of providing a steering feel to the driver considering at least one characteristic of the virtual linkage described above will be described in further detail.

Figure 2:
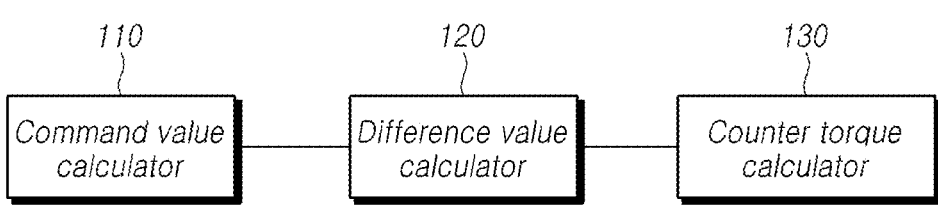
FIG. 2 is a block diagram schematically illustrating a steering control device according to aspects of the present disclosure.

FIG. 2 is a block diagram schematically illustrating a steering control device according to aspects of the present disclosure.

Referring to FIG. 2, the steering control apparatus 100 according to aspects of the present disclosure may include a command value calculator 110, a difference value calculator 120, a counter torque calculator 130, and the like.

The command value calculator 110 can calculate a rack movement command value indicating a movement of the rack 32 based on steering information generated by the turning of the steering wheel 11. In one embodiment, the steering angle sensor 12 can detect a steering angle of the steering wheel 11, and the command value calculator 110 can calculate the rack movement command value indicating the amount the rack 32 is to be moved according to the detected steering angle.

Here, the rack movement command value may refer to a value for indicating that the rack 32 is required to move to a specific position spaced apart from the central position (On-center), and the rack movement command value may include at least one of a rack position command value indicating a position of the rack 32 and a rack movement speed command value indicating a movement speed of the rack 32.

In one embodiment, the command the rack position command value for indicating the position of the rack 32.

In another embodiment, the command value calculator 110 can calculate the rack movement speed command value for indicating the movement speed of the rack 32.

In further another embodiment, in a case where the command value calculator 110 includes a differentiator, the command value calculator 110 can calculate the rack position command value first, and then, calculate the rack movement speed command value by differentiating the position of the rack 32 with respect to time.

The command value calculator 110 can output a command signal (or a driving current, etc.) corresponding to the rack movement command value to the steering motor 31 shown in FIG. 1 and the difference value calculator 120. In this case, the steering motor 31 can cause the rack 32 to linearly move in the axial direction according to the rack movement command value.

When the movement of the rack 32 is detected, the difference value calculator 120 can receive a rack movement detection value obtained by detecting the movement of the rack 32 and calculate a difference value between the rack movement command value and the rack movement detection value.

Here, the rack movement detect ion value may refer to a value indicated by a detection signal output by the rack position sensor 34 shown in FIG. 1.

In one embodiment, when the rack 32 performs a linear motion in the axial direction by the driving of the steering motor 31, the rack position sensor 34 can detect an actual position of the rack 32 and provide a detection signal corresponding to the rack movement detection value to the difference value calculator 120. In this situation, the difference value calculator 120 can calculate a difference value between the rack movement detection value indicated by the detection signal received from the rack position sensor 34 and the rack movement command value indicated by a command signal received from the command value calculator 110.

Here, the difference value may be a value calculated based on the rack movement command value. However, embodiments of the present disclosure are not limited thereto.

The difference value calculator 120 can provide an electrical signal corresponding to the calculated difference value to the counter torque calculator 130.

The counter torque calculator 130 can calculate a counter torque based on the difference value indicated by the electrical signal received from the difference value calculator 120 and one or more virtual linkage parameters set in advance.

The one or more virtual linkage parameter may be one or more parameters corresponding to one or more characteristics of a virtual linkage between the steering input device 10 including the steering wheel 11 etc. and the steering output device 30 including the rack 32 etc. shown in FIG. 1.

Here, the virtual linkage may refer to a linkage for using at least one characteristic of a mechanical linkage that is not actually included in the steering assistance system 1. For example, the virtual linkage may include a virtual torsion bar, a virtual damper, and the like. However, embodiments of the present disclosure are not limited thereto.

In one example, in a case where the virtual linkage is the virtual torsion bar, the virtual linkage parameter may be a torsion parameter of the virtual torsion bar.

In this case, since the torsion bar has excellent elasticity, the torsion parameter may be replaced with a spring parameter, which is a characteristic of a spring. In another example, the virtual linkage parameter may be a spring parameter of a virtual spring.

Since the torsion parameter and the spring parameter are factors affecting the elasticity of the torsion bar and the spring, the virtual parameters are not limited to the torsion parameter and the spring parameter, and may include any of elastic parameters affecting elasticity.

In further another example, the virtual linkage parameter may be a damping parameter of the virtual damper. However, embodiments of the present disclosure are not limited thereto.

Hereinafter, embodiments of calculating a counter torque will be described in detail.

Figure 3:
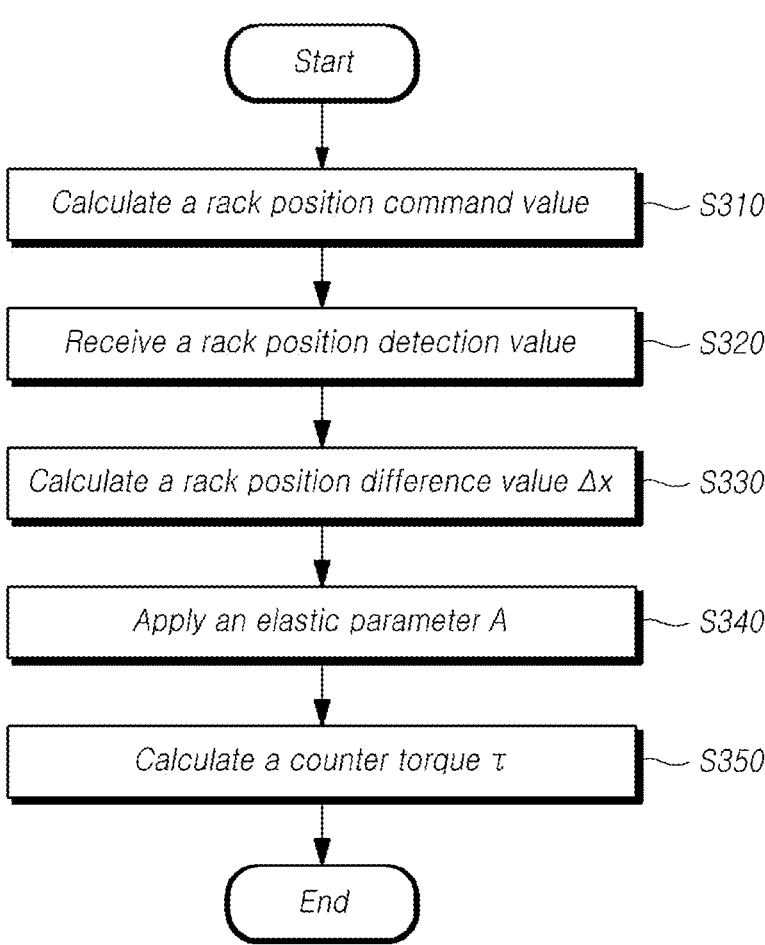
FIG. 3 is a flow sequence for a first embodiment of calculating a counter torque in the steering assistance system and/or the steering control device according to aspects of the present disclosure.

FIG. 3 is a flow sequence for a first embodiment of calculating a counter torque in the steering assistance system and/or the steering control device according to aspects of the present disclosure.

In a case where, the virtual linkage parameter is an elastic parameter of any one of the torsion parameter of the virtual torsion bar and the spring parameter of the virtual spring, the steering control device 100 according to aspects of the present disclosure can calculate a counter torque using a position of the rack 32 and the elastic parameter.

Referring to FIG. 3, the steering control device 100 can calculate a rack position command value, at step S310, and receive a rack position detection value, at step S320. For example, the command value calculator 110 can calculate the rack position command value based on a steering angle of the steering wheel 11, and provide the calculated rack position command value to the steering motor 31. The difference value calculator 120 can receive the rack position detection value from the rack position sensor 34.

Thereafter, the steering control device 100 can calculate a rack position difference value $\Delta x$, at step S330. For example, the difference value calculator 120 can receive the rack position command value and the rack position detection value obtained by detecting an actual position of the rack 32, and calculate the rack position difference value $\Delta x$ between the rack position command value and the rack position detection value.

Then, the steering control device 100 can apply the elastic parameter A to the rack position difference value $\Delta x$, at step S340, and calculate a counter torque $\tau$, at step S350. For example, the counter torque calculator 130 can calculate the counter torque ($\tau = A^*\Delta x$) by multiplying the rack position difference value $\Delta x$ by the elastic parameter A.

Figure 4:
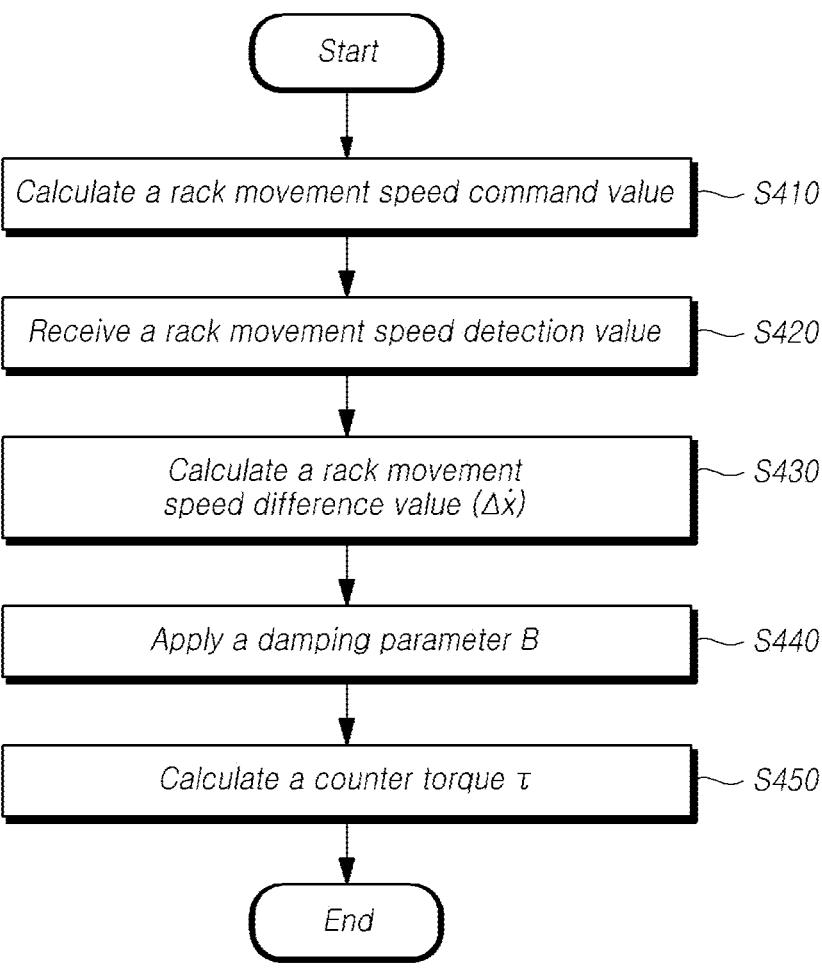
FIG. 4 is a flow sequence for a second embodiment of calculating a counter torque in the steering assistance system and/or the steering control device according to aspects of the present disclosure.

FIG. 4 is a flow sequence for a second embodiment of calculating a counter torque in the steering assistance system and/or the steering control device according to aspects of the present disclosure.

In a case where the virtual linkage parameter is the damping parameter of the virtual damper, the steering control device 100 according to aspects of the present disclosure can calculate a counter torque by using a movement speed of the rack 32 and the damping parameter.

Referring to FIG. 4, the steering control device 100 can calculate a rack movement speed command value, at step S410, and receive a rack movement speed detection value, at step S420. For example, the command value calculator 110 can calculate the rack movement speed command value based on a steering angle of the steering wheel 11. The difference value calculator 120 can receive the rack movement speed detection value from the rack position sensor 34.

Thereafter, the steering control device 100 can calculate a rack movement speed difference value $\Delta\dot{\chi}$, at step S430. For example, the difference value calculator 120 can receive the rack movement speed command value and the rack movement speed detection value obtained by detecting an actual movement speed of the rack 32, and can calculate the rack movement speed difference value $\Delta\dot{\chi}$ between the rack movement speed command value and the rack movement speed detection value.

Thereafter, the steering control device 100 can apply the damping parameter B to the rack movement speed difference value $\Delta\dot{\chi}$, at step S440, and calculate a counter torque $\tau$, at step S450. For example, the counter torque calculator 130 can calculate the counter torque ($\tau = B^*\Delta\dot{\chi}$) by multiplying the rack movement speed difference value $\Delta\dot{\chi}$ by the damping parameter B.

Figure 5:
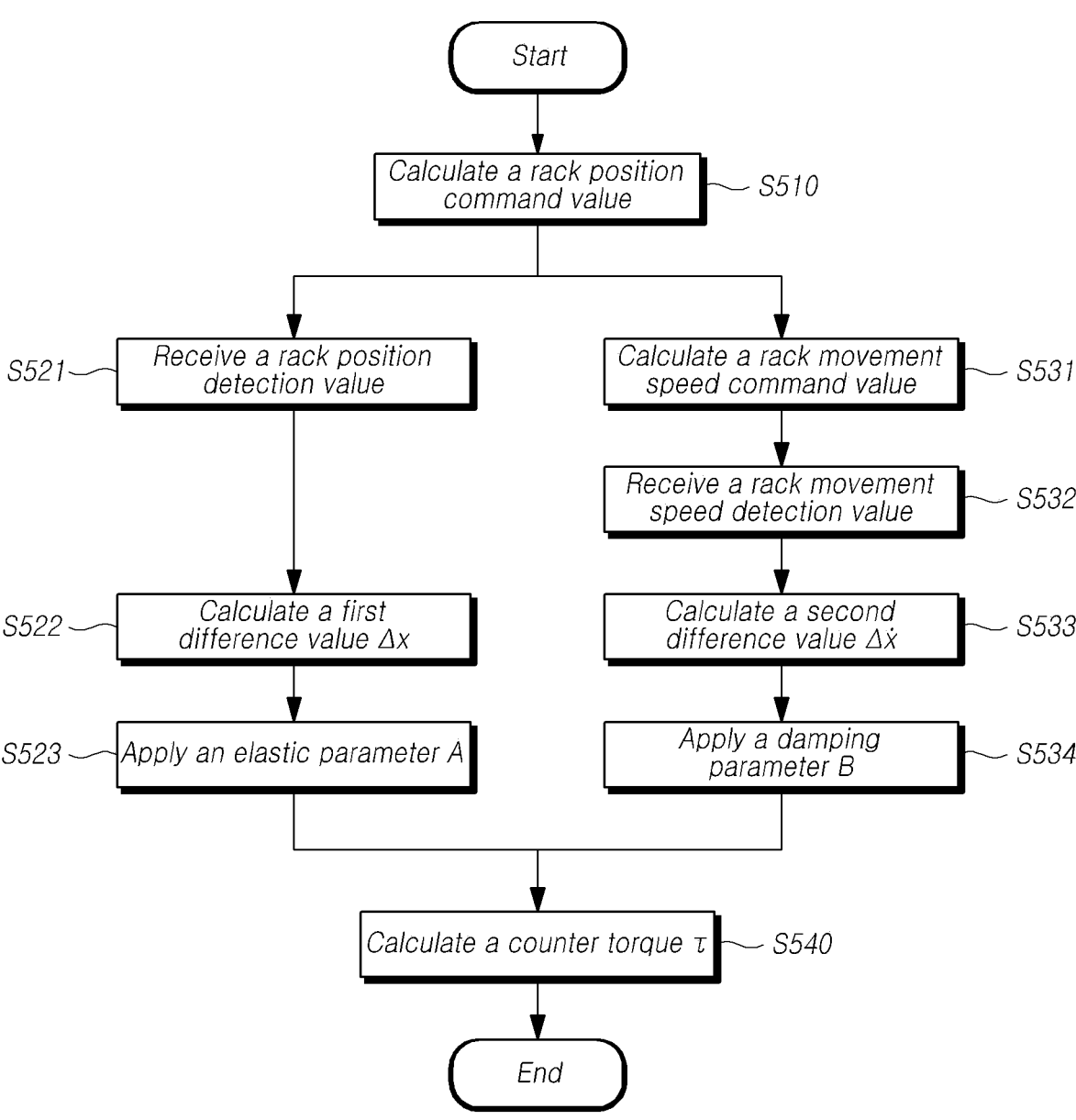
FIG. 5 is a flow sequence for a third embodiment of calculating a counter torque in the steering assistance system and/or the steering control device according to aspects of the present disclosure.

FIG. 5 is a flow sequence for a third embodiment of calculating a counter torque in the steering assistance system and/or the steering control device according to aspects of the present disclosure.

The steering control device 100 according to aspects of the present disclosure can calculate a counter torque using virtual linkage parameters including the elastic parameter and the damping parameter.

Referring to FIG. 5, the steering control device 100 can calculate a rack position command value, at step S510.

Thereafter, the steering control device 100 can receive a rack position detection value, at step S521, calculate a first difference value $\Delta x$, at step S522, and apply the elastic parameter A to the first difference value $\Delta x$, at step S523. Here, the first difference value $\Delta x$ may refer to a rack position difference value $\Delta x$.

The steering control device 100 can calculate a rack movement speed command value by differentiating the rack position command value, at step S531, receive a rack movement speed detection value, at step S532, calculate a second difference value $\Delta\dot{x}$, and apply the damping parameter to the second difference value $\Delta\dot{x}$, at step S533. Here, the second difference value $\Delta\dot{x}$ may refer to a rack movement speed difference value $\Delta\dot{x}$.

Then, the steering control device 100 can calculate a counter torque $\tau$ by adding a value obtained by applying the elastic parameter A to the first difference value $\Delta x$ and a value obtained by applying the damping parameter to the second difference value $\Delta\dot{x}$, at step S540.

For example, the difference value calculator 120 can calculate the first difference value $\Delta x$ between the rack position detection value obtained by detecting an actual position of the rack 32 and the rack position command value, and calculate the second difference value $\Delta\dot{x}$ between the rack movement speed detection value obtained by detecting an actual movement speed of the rack 32 and the rack movement speed command value.

Further, the counter torque calculator 130 can calculate a counter torque ($\tau=A^*\Delta x+B^*\Delta\dot{x}$) by adding a value ($A^*\Delta x$) obtained by multiplying the first difference value $\Delta x$ by the elastic parameter A, and a value ($B^*\Delta\dot{x}$) obtained by multiplying the second difference value $\Delta\dot{x}$ by the damping parameter B.

As described above, the steering control device 100 according to aspects of the present disclosure can provide the driver with an appropriate steer feel by determining an appropriate counter torque through the application of at least one characteristic of the virtual linkage.

Meanwhile, the virtual linkage parameters described above may always be constant for the characteristics of an equal virtual linkage, and may vary according to the virtual linkages having different characteristics.

Hereinafter, the counter torque determined according to virtual linkage parameters will be described with reference to graphs.

Figure 6:
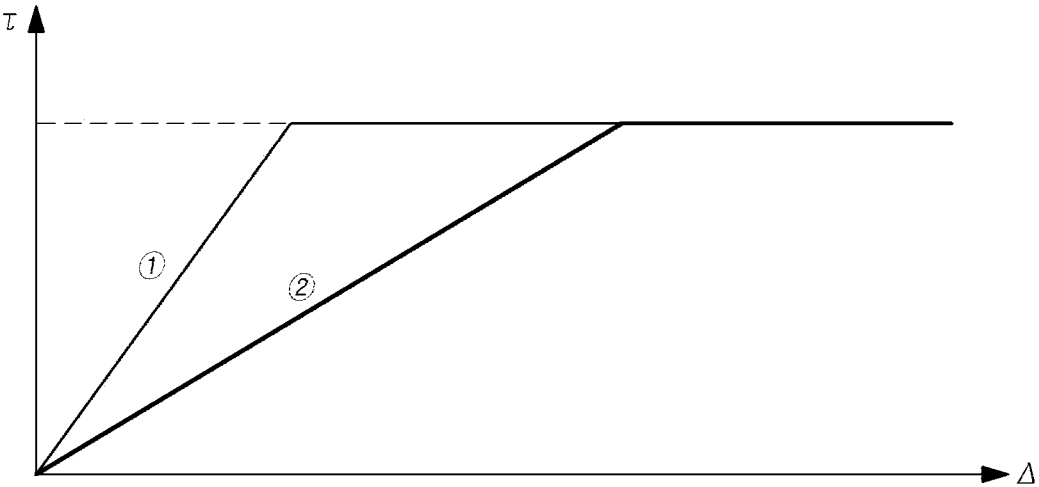
FIG. 6 is a graph representing a counter torque with respect to a difference value and a virtual linkage parameter that is a constant.
Figure 7:
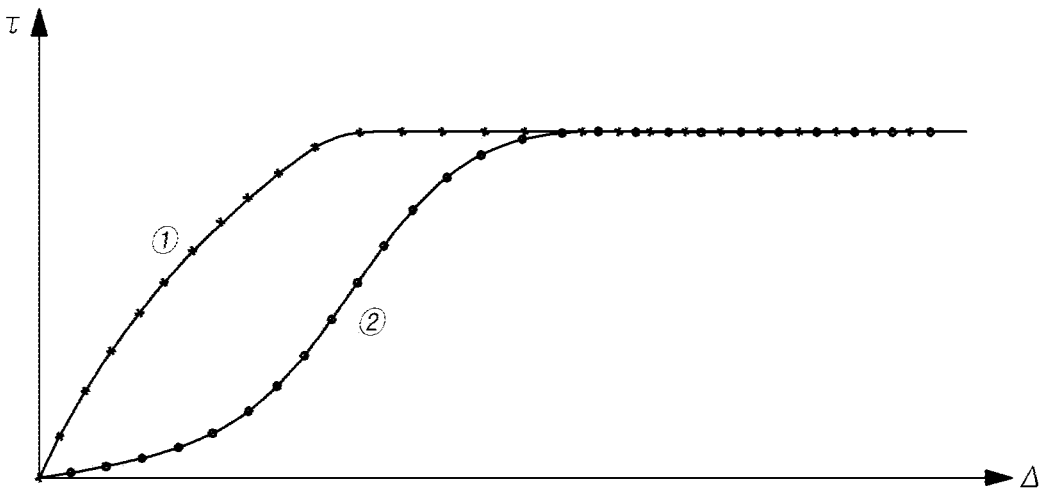
FIG. 7 is a graph representing a counter torque with respect to a difference value and a virtual linkage parameter that is a variable.

FIG. 6 is a graph denoting a counter torque with respect to a difference value and a virtual linkage parameter that is a constant. FIG. 7 is a graph denoting a counter torque with respect to a difference value and a virtual linkage parameter that is a variable.

Referring to FIG. 6, in a situation where a virtual linkage parameter is a constant independent of a difference value $\Delta$, as described above with reference to FIGS. 3 to 5, a counter torque T calculated by multiplying the difference value $\Delta$ by the virtual linkage parameter increases linearly according to the difference value $\Delta$.

At this case, as a value of the virtual linkage parameter increases, a slope of the counter torque $\tau$ increases.

For example, when a value of a first virtual linkage parameter is greater than that of a second virtual linkage parameter, a first slope ① of a counter torque calculated by multiplying the difference value $\Delta$ by the first virtual linkage parameter is greater than a second slope ② of a counter torque calculated by multiplying the difference value $\Delta$ by the second virtual linkage parameter.

The counter torque may increase limitedly as the difference value $\Delta$ increases with a limit of a preset maximum torque. This is to provide the driver with an appropriate steering feel and/or counter force.

That is, although the counter torque increases as the difference value increases, when the preset maximum torque is reached, even if the difference value increases, the counter torque may be constant at the same value as the maximum torque.

Referring to FIG. 7, in a situation where a virtual linkage parameter is a variable mapped based on a difference value, a counter torque $\tau$ calculated by multiplying the difference value $\Delta$ by the virtual linkage parameter increases nonlinearly according to the difference value $\Delta$.

Here, the nonlinear graph of the counter torque may be drawn in various ways. In one embodiment, in the case of a counter torque calculated by multiplying the difference value $\Delta$ and a third virtual linkage parameter, a graph ① for the counter torque may be a graph in which an increasing amount of the counter torque is gradually reduced as the difference value ($\Delta$) increases. In another embodiment, in the case of a counter torque calculated by multiplying the difference value $\Delta$ and a fourth virtual linkage parameter, a graph ② for the counter torque may be a graph in which an increasing amount of the counter torque varies as the difference value ($\Delta$) increases. However, embodiments of the present disclosure are not limited thereto.

Meanwhile, while the vehicle is traveling, there are present various traveling situations that are difficult to be predicted. Therefore, it is necessary to adjust the maximum torque described above in order to provide an appropriate steering feel to drivers according to traveling situations.

Hereinafter, embodiments of calculating a counter torque based on steering information, traveling information, and the like will be described.

Figure 8:
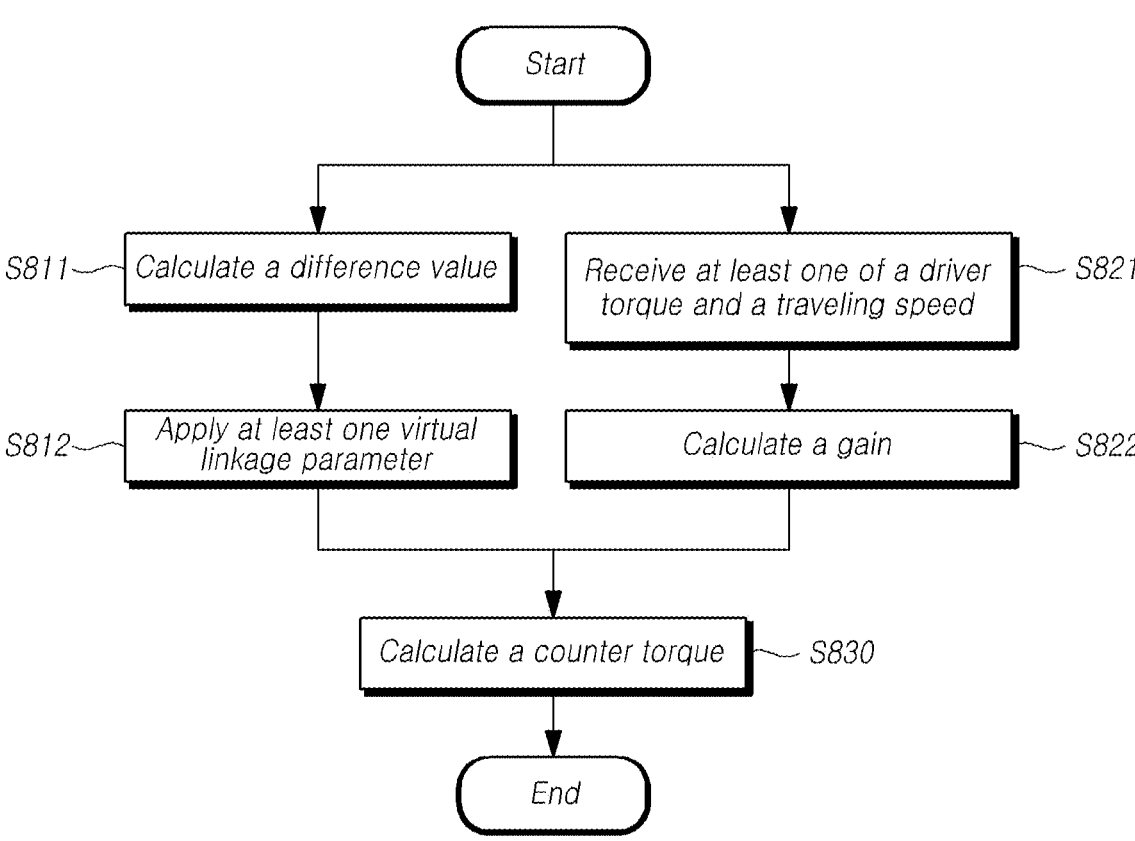
FIG. 8 is a flow sequence for a fourth embodiment of calculating a counter torque in the steering assistance system and/or the steering control device according to aspects of the present disclosure.
Figure 9:
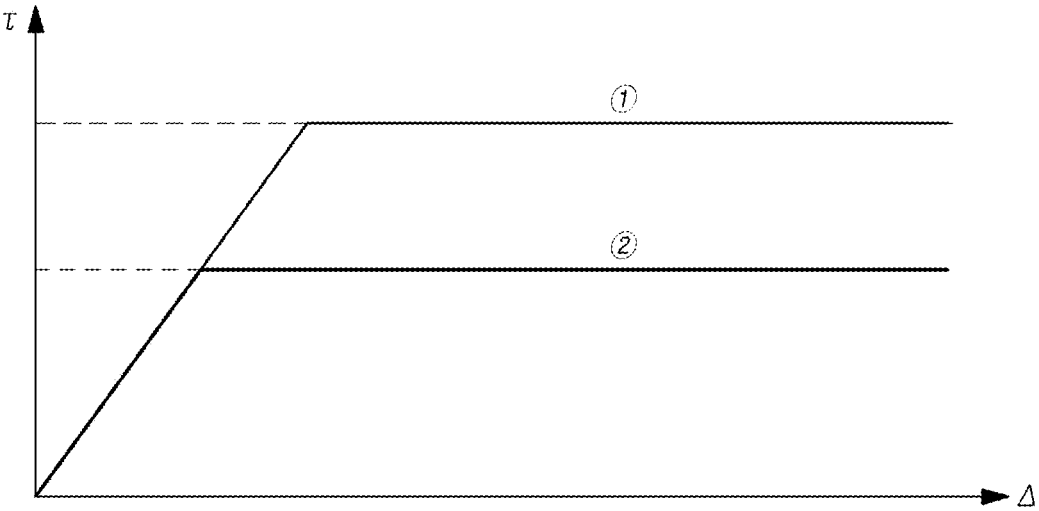
FIG. 9 is a graph representing a counter torque to which a gain is applied and a counter torque to which a gain is not applied.

FIG. 8 is a flow sequence for a fourth embodiment of calculating a counter torque in the steering assistance system and/or the steering control device according to aspects of the present disclosure. FIG. 9 is a graph denoting a counter torque to which a gain is applied and a counter torque to which a gain is not applied.

Referring to FIG. 8, as discussed in the embodiments described above, the steering control device 100 can calculate a difference value using a rack movement command value and a rack movement detect ion value, at step S811, and apply at least one virtual linkage parameter to the difference value, at step S812.

The steering control device 100 can receive at least one of steering information and traveling information, at step S821. Specifically, the steering control device 100 can receive at least one of a driver torque generated by the turning of the steering wheel by a driver and a traveling speed, at step S821. Thereafter, the steering control device 100 can calculate a gain based on the received information, at step S822. That is, the gain may be a value for changing a counter torque according to the driver torque and the traveling speed.

Next, the steering control device 100 can calculate a counter torque by using the gain and a value obtained by applying the at least one virtual linkage parameter to the difference value, at step S830.

In one embodiment, the counter torque calculator 130 can receive the steering information including the driver torque, calculate a first gain based on the steering information, and calculate the counter torque by applying the first gain to the value obtained by applying the at least one virtual linkage parameter to the difference value.

In another embodiment, the counter torque calculator 130 can receive the traveling information including the traveling speed of the vehicle, calculate a second gain based on the traveling information, and calculate the counter torque by applying the second gain to the value obtained by applying the at least one virtual linkage parameter to the difference value.

In this situation, as described above with reference to FIGS. 3 to 5, the difference value may be at least one of the first difference value and the second difference value, and the virtual linkage parameter may also be at least one of the elastic parameter and the damping parameter, The counter torque calculator 130 may calculate the counter torque by multiplying the difference value by the virtual linkage parameter and the gain, and may limit the counter torque to a maximum torque set in advance.

As described above, the steering control device 100 can flexibly change a counter torque depending on a traveling situation of a vehicle by determining the counter torque through the application of a gain.

Referring to FIG. 9, for example, under an equal virtual linkage parameter condition, it can be seen that the maximum value (①) of a first counter torque to which a gain is applied is greater than the maximum value (②) of a second counter torque to which the gain is not applied. However, embodiments of the present disclosure are not limited thereto. For example, contrary to that shown in FIG. 9, the maximum value of a counter torque to which a gain is applied may be smaller than the maximum value of a counter torque to which the gain is not applied.

Figure 10:
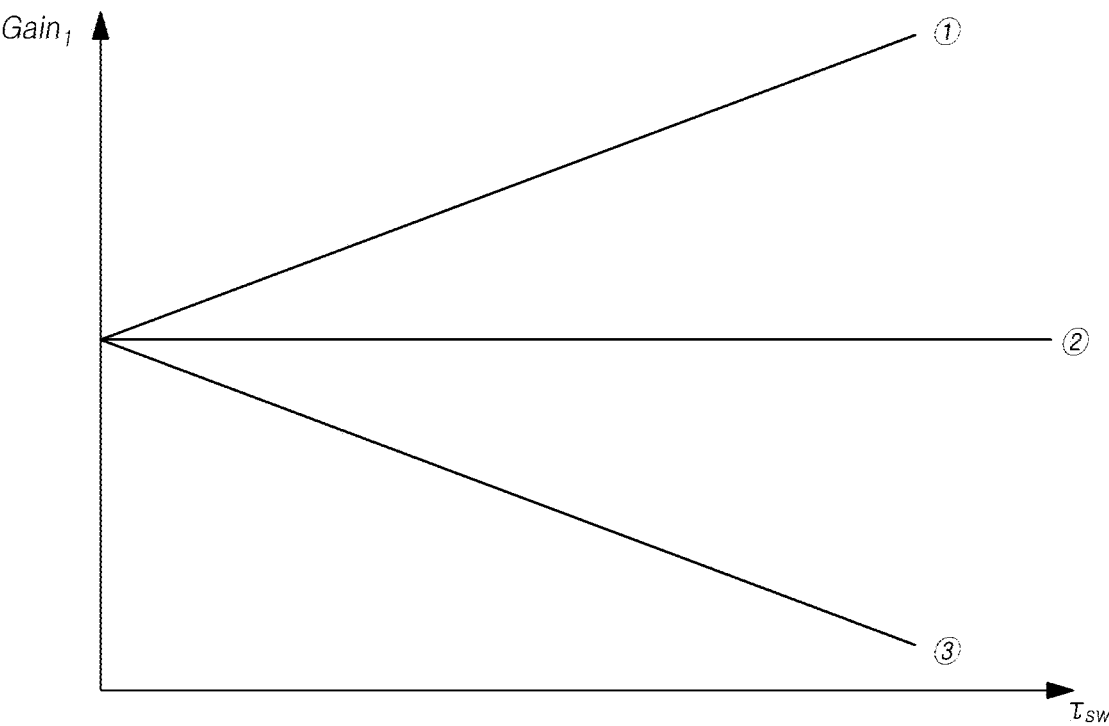
FIGS. 10 and 11 are graphs representing first gains according to driver torques.
Figure 11:
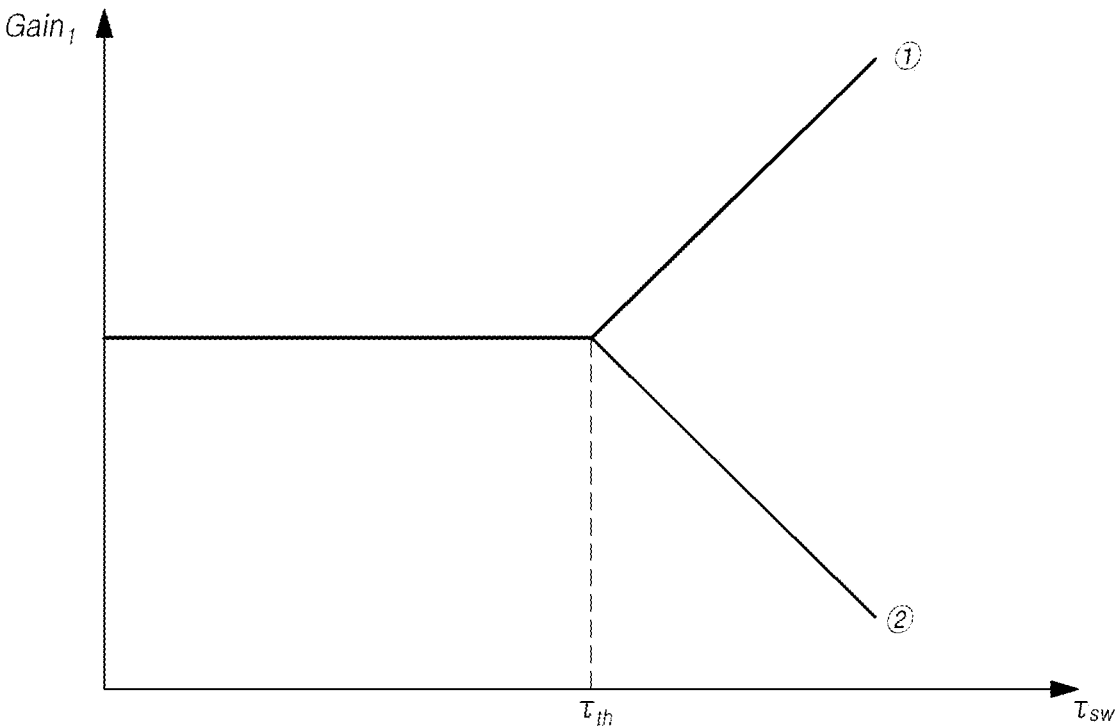

FIGS. 10 and 11 are graphs denoting first gains Gain1 according to a torque supplied by a driver.

Referring to FIG. 10, the first gain Gain1 may increase (①) or decrease (③) as a value of the driver torque τSW increases, or is constant (②) regardless of the value of the driver torque τSW. This is because it may be needed to increase a level of the steering feel even when the steering wheel 11 is turned with a driver torque τSW having a relatively small value, or reduce the level of the steering feel depending on situations.

Referring to FIG. 11, in a situation where a value of the driver torque τSW is smaller than or equal to a preset threshold value τth, the first gain Gain1 may be constant independent of the value of the driver torque τSW, and in a situation where the value of the driver torque τSW is greater than the threshold value τth, the first gain Gain1 may increase or decrease as the value of the driver torque τSW increases.

Figure 12:
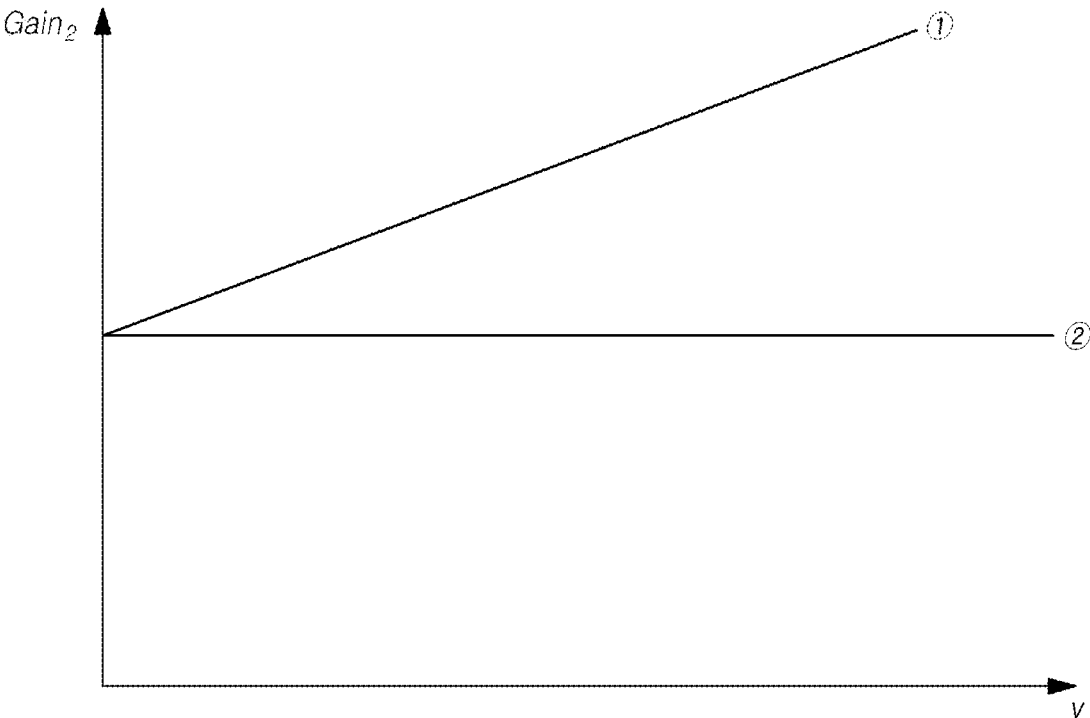
FIGS. 12 and 13 are graphs representing second gains according to traveling speeds.
Figure 13:
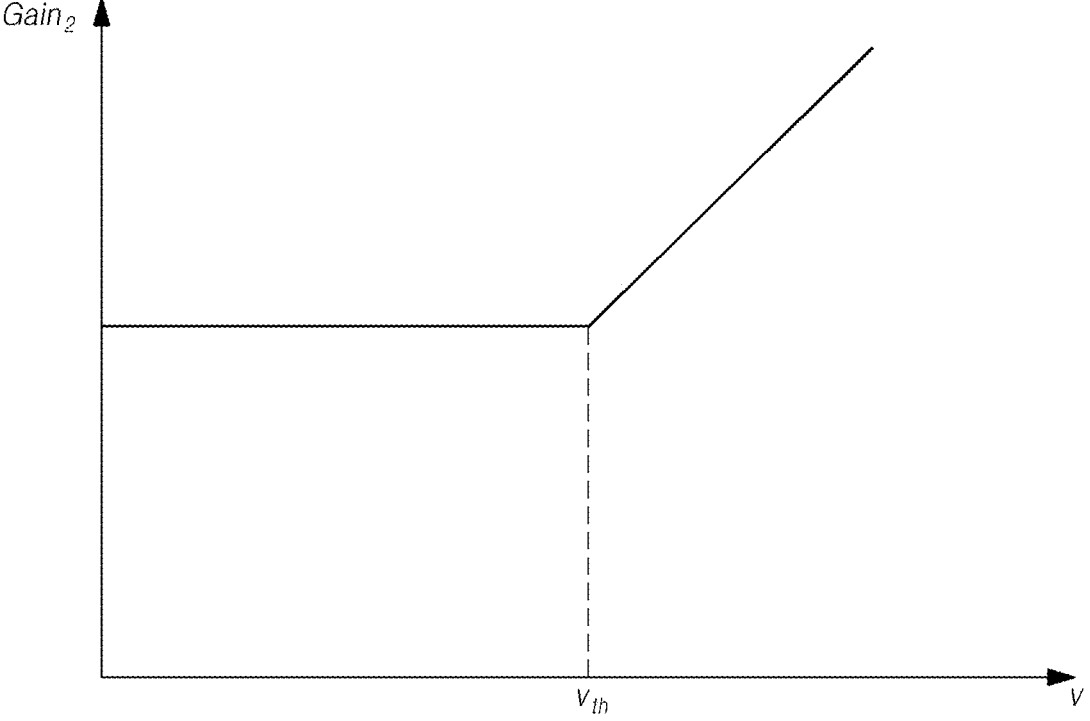

FIGS. 12 and 13 are graphs denoting second gains Gain2 according to traveling speeds.

Referring to FIG. 12, the second gain Gain2 may increase (①) as a value of the travel speed increases, or may be constant (②) independent of the value of the traveling speed v. This is because, in general, as the traveling speed v increases, it may be needed to provide the driver with a greater steering feel than a normal situation.

Referring to FIG. 13, in a situation where a value of the traveling speed v is smaller than or equal to a preset threshold value vth, the second gain Gain2 may be constant independent of the value of the traveling speed v, and in a situation where the value of the traveling speed v is greater than the threshold value vth, the second gain Gain2 may increase as the value of the traveling speed v increases.

As described above, the steering control device 100 according to according to aspects of the present disclosure can provide an appropriate steering feel to the driver by implementing a counter torque through the application of information related to a traveling situation, as well as information related to a connection between the steering wheel 11 and the rack.

Hereinafter, a steering control method capable of performing all or some of the embodiments described herein will be described.

Figure 14:
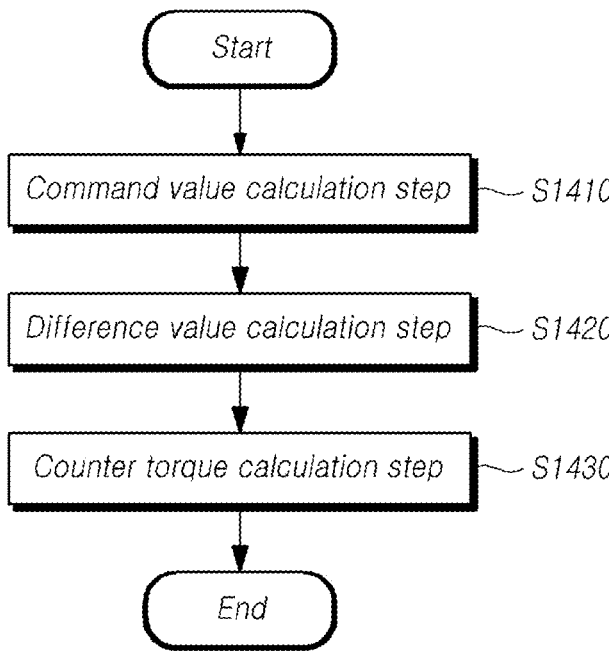
FIG. 14 is a flow sequence of a steering control method according to aspects of the present disclosure.

FIG. 14 is a flow sequence of the steering control method according to aspects of the present disclosure.

Referring to FIG. 14, the steering control method according to aspects of the present disclosure may include a command value calculation step, a difference value calculation step, a counter torque calculation step, and the like.

In the command value calculation step, a rack movement command value indicating a movement of the rack can be calculated based on steering information according to the turning of the steering wheel 11.

In the difference value calculation step, when the movement of the rack is detected, a rack movement detection value obtained by detecting the movement of the rack can be received, and a difference value between the rack movement command value and the rack movement detection value can be calculated.

In the counter torque calculation step, a counter torque can be calculated based on the difference value and one or more virtual linkage parameters set in advance.

Here, the one or more virtual linkage parameters may correspond to one or more characteristics of the virtual linkage described above.

According to the embodiments described herein, it is possible to provide steering control devices, steering control methods, and steering assistance systems that provide an appropriate steering feel to a driver by determining an appropriate counter torque through the application of one or more characteristics of the virtual linkage.

Further, according to the embodiments described herein, it is possible to provide steering control devices, steering control methods, and steering assistance systems that provide an optimal steering feel to a driver by implementing a counter torque through the application of information related to a traveling situation, as well as information related to a connection between the steering wheel and the rack.

The above description and attached drawings have been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED
APPLICATION

If applicable, this application claims the priority benefit under 35 U.S.C § 119(a) of Patent Application No. 10-2019-0067515, filed on Jun. 7, 2019 in Korea, the entire contents of which are incorporated herein by reference. In addition, this non-provisional application claims priorities in countries other than the U.S. for the same reason based on the Korean Patent Application, the entire contents of which are hereby incorporated by reference.

What is claimed is:

1. A steering control device included in a steering assistance system comprising an electronic controller unit configured to:

calculate a rack movement command value indicating a movement of a rack based on steering information according to turning of a steering wheel;

receive a rack movement detection value obtained by detecting the movement of the rack when the movement of the rack is detected, and calculate a difference value between the rack movement command value and the rack movement detection value;

calculate a torque based on the difference value and two virtual linkage parameters; and control a motor to apply the torque, calculated based on the difference value and the two virtual linkage parameters, to the steering wheel, wherein the two virtual linkage parameters correspond to two characteristics of a virtual linkage between the steering wheel and the rack, which are mechanically separated, wherein the two virtual linkage parameters include an elastic parameter comprising a torsion parameter of a virtual torsion bar or a spring parameter of a virtual spring, and further include a damping parameter of a virtual damper, wherein the rack movement command value includes a rack position command value and a rack movement speed command value, wherein the electronic controller unit is configured to calculate a first difference value between the rack position command value and a rack position detection value obtained by detecting an actual position of the rack, and calculate a second difference value between the rack movement speed command value and a rack movement speed detection value obtained by detecting an actual movement speed of the rack, and wherein the electronic controller unit is configured to calculate the torque by applying the elastic parameter of the torsion parameter of the virtual torsion bar or the spring parameter of the virtual spring to the first difference value between the rack position command value and the rack position detection value and applying the damping parameter of the virtual damper to the second difference value between the rack movement speed command value and the rack movement speed detection value, and wherein at least one of the two virtual linkage parameters is a variable mapped based on at least one of the first and second difference values.

2. The vehicle control device according to claim 1, wherein the rack movement command value includes the rack position command value indicating a position of the rack, and wherein the electronic controller unit is configured to receive the rack position detection value obtained by detecting the actual position of the rack, and calculate the first difference value between the rack position command value and the rack position detection value.

3. The vehicle control device according to claim 1, wherein the electronic controller unit is configured to receive the rack movement speed detection value obtained by detecting the actual movement speed of the rack, and calculate the second difference value between the rack movement speed command value and the rack movement speed detection value.

4. The vehicle control device according to claim 1, wherein the electronic controller unit is configured to calculate the torque by adding a value obtained by multiplying the first difference value by the elastic parameter and a value obtained by multiplying the second difference value by the damping parameter.

5. The vehicle control device according to claim 1, wherein the electronic controller unit is configured to calculate the torque by multiplying each of the first and second difference values by one of the virtual linkage parameters, and wherein the torque increases as the first or second difference value increases, and when the torque reaches a maximum torque set in advance, the torque remains at a same value as the maximum torque even when the first or second difference value increases.

6. The vehicle control device according to claim 1, wherein the electronic controller unit is configured to calculate a first gain based on the steering information, and calculate the counter torque by applying the first gain to a value obtained by applying one of the two virtual linkage parameters to the first or second difference value.

7. The vehicle control device according to claim 6, wherein the steering information includes a driver torque generated by the turning of the steering wheel by a driver, and wherein the first gain increases or decreases as a value of the driver torque increases, or is constant independent of the value of the driver torque.

8. The vehicle control device according to claim 6, wherein the steering information includes a driver torque generated by the turning of the steering wheel by a driver, and wherein when a value of the driver torque is smaller than or equal to a preset threshold value, the first gain is constant independent of the value of the driver torque, and when the value of the driver torque is greater than the preset threshold value, the first gain increases or decreases as the value of the driver torque increases.

9. The vehicle control device according to claim 1, wherein the electronic controller unit is configured to further receive traveling information of a vehicle, calculate a second gain based on the traveling information, and calculate the torque by applying the second gain to a value obtained by applying one of the two virtual linkage parameters to the first or second difference value.

10. The vehicle control device according to claim 9, wherein the traveling information includes a traveling speed of the vehicle, and wherein the second gain increases as a value of the traveling speed increases, or is constant independent of the value of the traveling speed.

11. The vehicle control device according to claim 9, wherein the traveling information includes traveling speed information of the vehicle, and wherein when a value of the traveling speed is smaller than or equal to a preset threshold value, the second gain is constant independent of the value of the traveling speed, and when the value of the traveling speed is greater than the preset threshold value, the second gain increases as the value of the traveling speed increases.

12. A steering control method, the method comprising:

calculating a rack movement command value indicating a movement of a rack based on steering information according to turning of a steering wheel;

by receiving a rack movement detection value obtained by detecting the movement of the rack when the movement of the rack is detected, calculating a difference value between the rack movement command value and the rack movement detection value;

calculating a torque based on the difference value and two virtual linkage parameters; and controlling a motor to apply the torque, calculated based on the difference value and the two virtual linkage parameters, to the steering wheel, wherein the two virtual linkage parameters correspond to two characteristics of a virtual linkage between the steering wheel and the rack, which are mechanically separated, wherein the two virtual linkage parameters include an elastic parameter comprising a torsion parameter of a virtual torsion bar or a spring parameter of a virtual spring, and further include a damping parameter of a virtual damper, wherein the rack movement command value includes a rack position command value and a rack movement speed command value, wherein the calculating of the difference value between the rack movement command value and the rack movement detection value comprises calculating a first difference value between the rack position command value and a rack position detection value obtained by detecting an actual position of the rack, and calculating a second difference value between the rack movement speed command value and a rack movement speed detection value obtained by detecting an actual movement speed of the rack, wherein the calculating of the torque comprises calculating the torque by applying the elastic parameter of the torsion parameter of the virtual torsion bar or the spring parameter of the virtual spring to the first difference value between the rack position command value and the rack position detection value and applying the damping parameter of the virtual damper to the second difference value between the rack movement speed command value and the rack movement speed detection value, and wherein at least one of the two virtual linkage parameters is a variable mapped based on at least one of the first and second difference values.

13. A steering assistance system having a structure in which a steering input device and a steering output device are mechanically separated, the steering assistance system comprising:

a steering angle sensor for detecting a steering angle according to turning of a steering wheel;

a force-generating motor for supplying a force to the steering wheel;

a steering motor for axially moving a rack;

a rack position sensor for detecting a position of the rack; and a steering control device comprising an electronic controller unit configured to control the steering motor based on steering information and control the force-generating motor based on the steering information and rack position information received from the rack position sensor, wherein the electronic controller unit is configured to calculate a rack movement command value indicating a movement of the rack based on the steering information, calculate a difference value between the rack movement command value and a rack movement detection value received from the rack position sensor, calculate a torque based on the difference value and two virtual linkage parameters set in advance, and supply a driving current corresponding to the calculated torque to the force-generating motor, wherein the two virtual linkage parameters corresponds to two characteristics of a virtual linkage between the steering input device and the steering output device, wherein the two virtual linkage parameters include an elastic parameter comprising a torsion parameter of a virtual torsion bar or a spring parameter of a virtual spring, and further include a damping parameter of a virtual damper, wherein the rack movement command value includes a rack position command value and a rack movement speed command value, wherein the electronic controller unit is configured to calculate a first difference value between the rack position command value and a rack position detection value obtained by detecting an actual position of the rack, and calculate a second difference value between the rack movement speed command value and a rack movement speed detection value obtained by detecting an actual movement speed of the rack, wherein the electronic controller unit is configured to calculate the torque by applying the elastic parameter of the torsion parameter of the virtual torsion bar or the spring parameter of the virtual spring to the first difference value between the rack position command value and the rack position detection value and applying the damping parameter of the virtual damper to the second difference value between the rack movement speed command value and the rack movement speed detection value, and wherein of the at least one two virtual linkage parameters is a variable mapped based on at least one of the first and second difference values.

14. The steering assistance system according to claim 13, further comprising a driver-supplying-torque sensor for detecting a driver torque generated by the turning of the steering wheel, wherein the steering control device calculates a first gain based on the driver torque, and calculates the counter torque by applying the first gain to a value obtained by applying at least one of the two virtual linkage parameters to the first or second difference value.

15. The steering assistance system according to claim 13, further comprising a vehicle speed sensor for detecting a traveling speed of a vehicle, wherein the counter torque calculator calculates a second gain based on the traveling speed, and calculates the torque by applying the second gain to a value obtained by applying at least one of the two virtual linkage parameters to the first or second difference value.

* * * * *